(12) United States Patent
Son

(10) Patent No.: US 8,100,390 B2
(45) Date of Patent: Jan. 24, 2012

(54) CLAMP DEVICE

(75) Inventor: Byung Ki Son, Ulsan (KR)

(73) Assignee: Hyundai Motor Company, Seoul (KR)

( * ) Notice: Subject to any disclaimer, the term of this patent is extended or adjusted under 35 U.S.C. 154(b) by 303 days.

(21) Appl. No.: 12/494,376

(22) Filed: Jun. 30, 2009

(65) Prior Publication Data

US 2010/0109222 A1 May 6, 2010

(30) Foreign Application Priority Data

Nov. 3, 2008 (KR) .......................... 10-2008-0108539

(51) Int. Cl.
*B23Q 3/08* (2006.01)
(52) U.S. Cl. ............................................ 269/22; 269/20
(58) Field of Classification Search .................. 269/222, 269/21, 20, 900
See application file for complete search history.

(56) References Cited

U.S. PATENT DOCUMENTS

| 6,827,344 B1* | 12/2004 | Ristau ............................. 269/21 |
| 6,898,838 B2* | 5/2005 | Gordon ........................... 29/559 |
| 7,686,287 B2* | 3/2010 | Dixon et al. ..................... 269/75 |
| 2009/0057971 A1* | 3/2009 | Bumgarner et al. ............ 269/21 |
| 2010/0109222 A1* | 5/2010 | Son .................................. 269/22 |

FOREIGN PATENT DOCUMENTS

WO    WO2008/107672 A1    9/2008

* cited by examiner

*Primary Examiner* — Lee D Wilson
(74) *Attorney, Agent, or Firm* — Edwards Wildman Palmer LLP; Peter F. Corless

(57) ABSTRACT

A clamp device for clamping a panel regardless of the panel's shape may include an air conduit, an air supplying unit that is communicated with the air conduit for selectively supplying air thereto and a tube that is connected with the air conduit to communicate therewith and expanded outwardly.

12 Claims, 6 Drawing Sheets

CLAMP DEVICE

CROSS-REFERENCE TO RELATED APPLICATION

This application claims priority to and the benefit of Korean Patent Application No. 10-2008-0108539, filed on Nov. 3, 2008, the entire contents of which are incorporated herein by reference.

BACKGROUND (a) Technical Field

The present disclosure relates to a clamp device which can clamp a panel regardless of the shape of the panel.

(b) Related Art

In an assembling process of a vehicle manufacturing line, a camp device is used for clamping and moving a panel.

As the shapes and sizes of panels are different, various camp devices are used in each manufacturing lines. Further, for manufacturing different kinds of vehicles, it may be have to use a number of different clamp devices.

In addition, a clamp device must be inserted between an inner panel and an outer panel for clamping, e.g., a door panel of a vehicle body line. However, as a gap for inserting the clamp device is very small, it is required to control the clamp device precisely. As a result, it may result in increase in manufacturing costs and decrease in overall productivity. Also, mere a little error may significantly damage the panel (s).

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention has been made in an effort to provide a clamp device which can clamp a panel regardless of the shape of the panel.

A clamp device according to an embodiment comprises an air conduit, an air supplying unit that is communicated with the air conduit for selectively supplying air thereto, and a tube that is communication with the air conduit and is expandable in a circumferential direction.

The air supplying unit may comprise an air hose connected with an end of the air conduit, a cylinder housing connected to the air hose, a piston disposed within the cylinder housing, and a driving unit for reciprocating the piston so that some or all of air inside the cylinder housing can be exhausted.

Preferably, the clamp device may further comprise a guide surface and/or a guide plate for guiding the direction of expansion of the tube in a desired direction or directions.

Preferably, the clamp device may further comprise a shock absorbing plate beneath or below the guide plate.

Preferably, the clamp device may further comprise an absorber between the guide surface and the air conduit.

Preferably, the clamp device may further comprise a guide protrusion at or near the inner center of the guide surface.

The above-described clamp devices may clamp a panel regardless of the shape of the panel in a simple and easy way and may be applied to a assembly process for different kinds of vehicles as well as obviating the problems associated with the prior art.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the invention are discussed infra.

Figure 1:
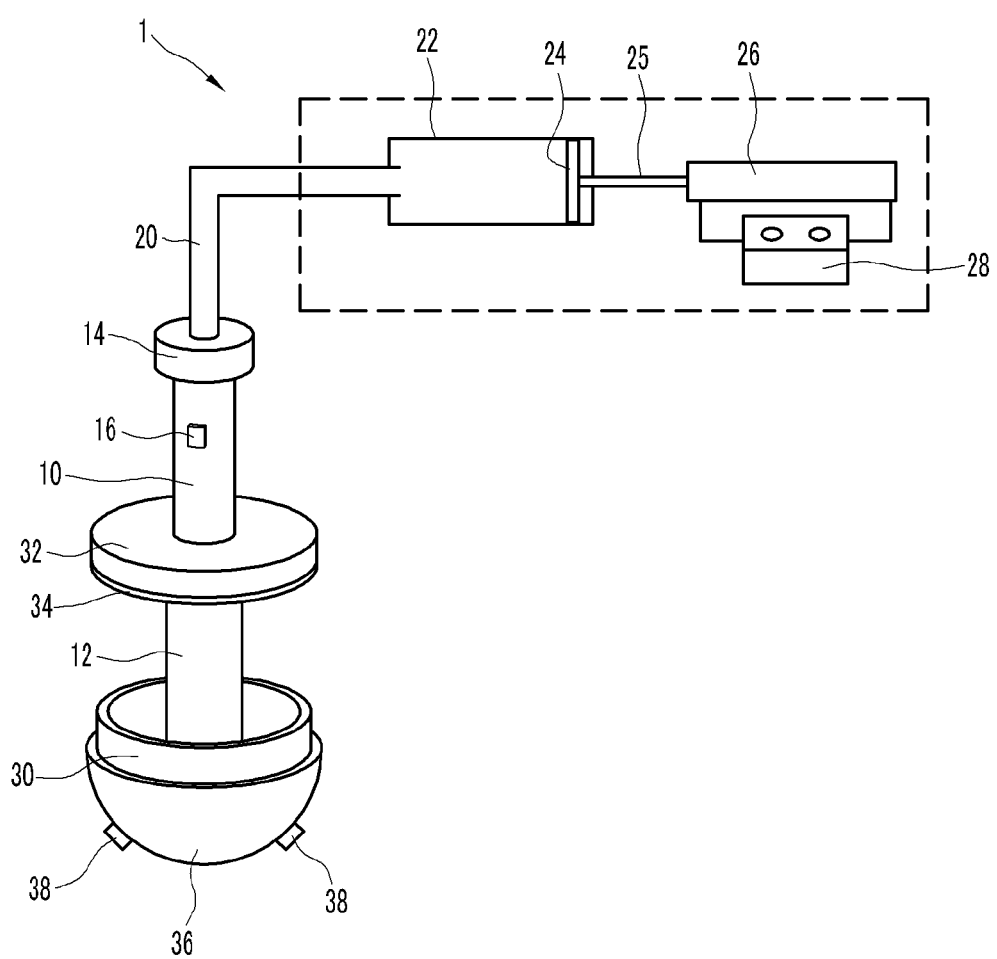
FIG. 1 is a perspective view of a clamp device according to an exemplary embodiment of the present invention.

Reference numerals set forth in the Drawings includes reference to the following elements as further discussed below:

| 10: air conduit | 12: tube |
| 20: air hose | 22: cylinder housing |
| 24: piston | 26: driving cylinder |
| 30: guide surface | 32: guide plate |
| 34: shock absorbing plate | 36: cover |
| 40: absorber | 42: guide protrusion |

DETAILED DESCRIPTION OF THE EMBODIMENTS

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention (s) is/are intended to cover not only the exemplary embodiments, but also various alternatives, modifications, equivalents and other embodiments, which may be included within the spirit and scope of the invention as defined by the appended claims.

Figure 2:
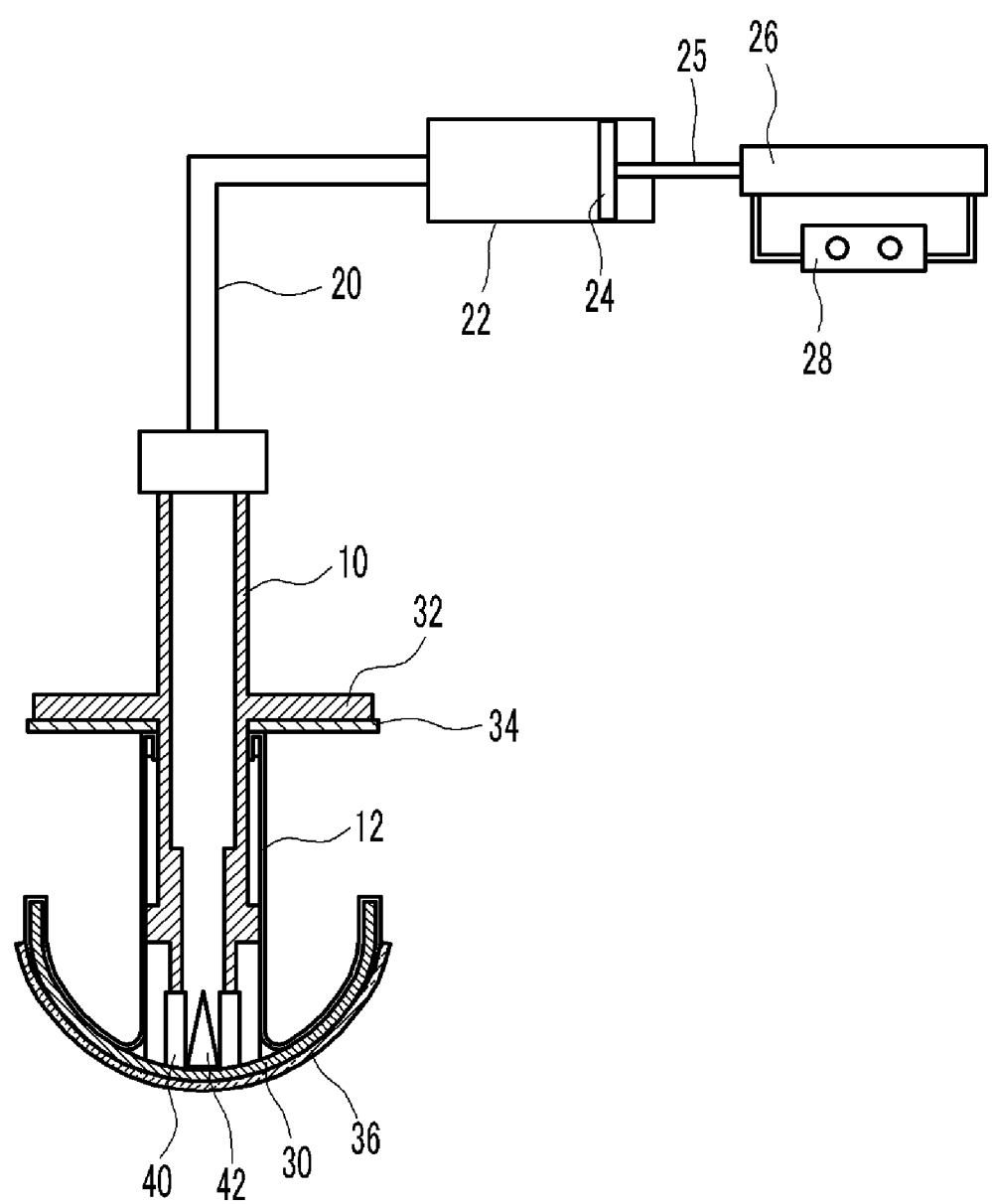
FIG. 2 is a cross-sectional view of a clamp device according to an exemplary embodiment of the present invention.

FIG. 1 and FIG. 2 FIG. 1 are a perspective view and a cross-sectional view, respectively, of a clamp device according to an exemplary embodiment of the present invention.

A clamp device 1 according to an embodiment of the present invention may include an air conduit 10, an air supplying unit, and a tube 12.

Figure 5:
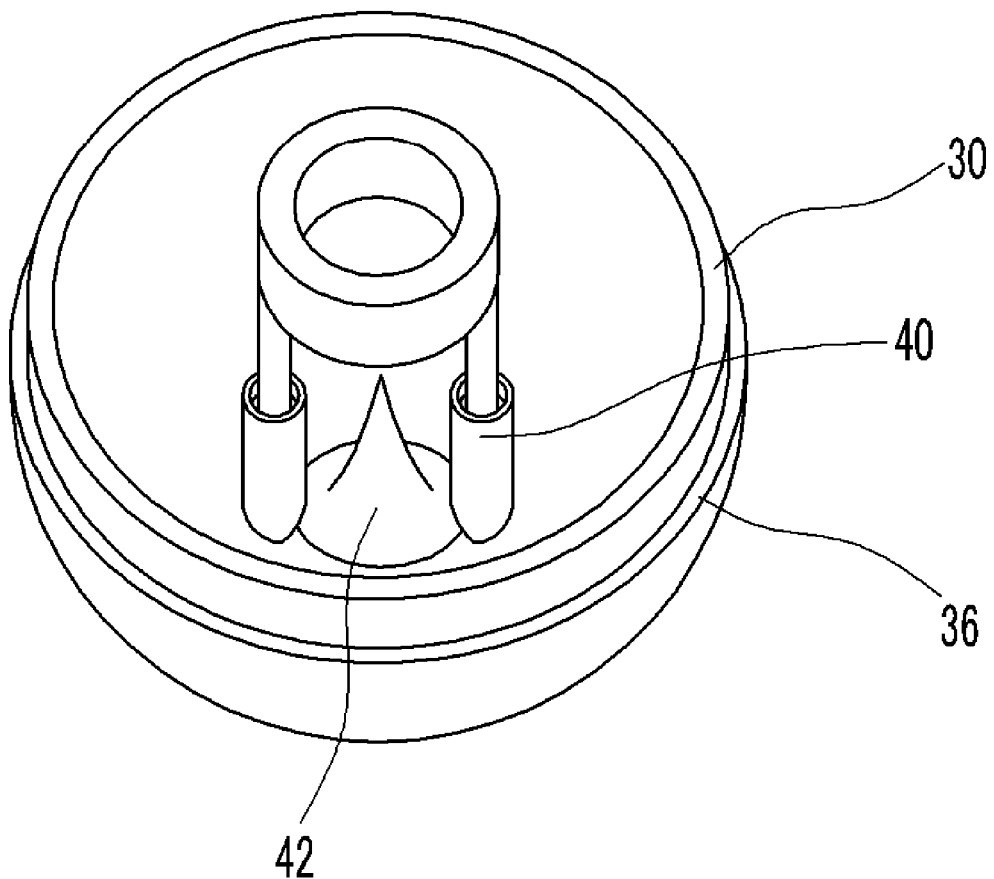

The tube 12 is air-tight connected to the air conduit 10 to communicate therewith. The air supplying unit is communicated with the air conduit 10 for selectively supplying air thereto. The tube 12 may be expanded outwardly to clamp a panel using air pressure. The air conduit 10 may be, for example, a pipe supporting the tube 12. The lower end of the air conduit 10, as shown in FIG. 5, is opened and air can be ejected through the opened end.

Preferably, the air supplying unit includes an air hose 20, a cylinder housing 22 and a driving unit. The air hose 20 is connected to the other end of the air conduit 10 via a connecting element 14. The air hose 20 communicates with the cylinder housing 22. The piston 24 is disposed within the cylinder housing 22 and air is stored in the cylinder housing 22. The cylinder housing 22 and the tube 12 are connected through the air hose 20 and the air conduit 10 and form a closed space.

Figure 3:
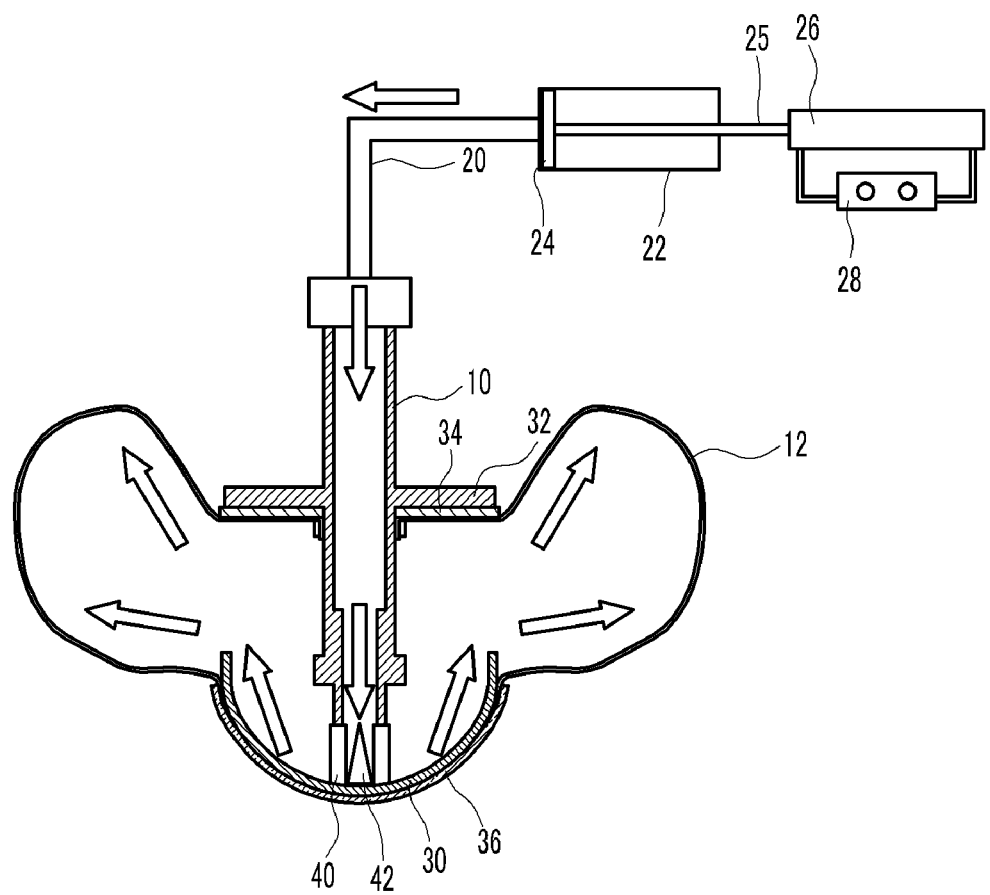
FIG. 3 is a cross-sectional view showing an operation principle of a clamp device according to an exemplary embodiment of the present invention.

Thus, as shown in FIG. 3, when the piston 24 is moved, some or all of the air within the cylinder housing 22 is pushed out of the cylinder housing 22. The pushed air is supplied to the tube 12, causing the tube 12 to be expanded. When the piston 24 is moved back to an original position, the air within the tube 12 flows back to the cylinder housing 22 and the tube 12 is constricted. Accordingly, the tube 12 can be expanded within a panel and come in contact with a panel so that the clamp device 1 may clamp a panel regardless of the shape/type of the panel.

The driving unit functions to reciprocate the piston 24 within the cylinder housing 22. It includes a driving cylinder 26 connected to the piston 24. A piston rod 25 of the driving cylinder 26 is extended within the cylinder housing 22 land connected to the piston 24. The piston 24 reciprocates within the cylinder housing 22 according to reciprocating movement of the piston rod 25. The reference numeral 28 in the drawings indicates a solenoid valve which controls the driving cylinder 26 and the reference numeral 16 indicates a pressure gauge which is disposed at a circumferential side of the air conduit 10 for detecting internal pressure of the air conduit 10.

The device 1 may further include a guide surface 30. The guide surface 30 is provided below the end of the air conduit (i.e., the lower end of the air conduit 10 of FIG. 3). It has a curved interior surface. The interior surface can be continuously or discontinuously curved. Preferably, the interior surface may be shaped as a continuous hemisphere, as shown in FIG. 1. The guide surface 30 thus may prevent the tube 12 from expanding along length direction of the air conduit 10 and guide air ejected from the air conduit 10 to the tube 12 so that the tube 12 can be expanded to circumferential directions of the air conduit 10.

The device 1 may further include a guide plate 32. The guide plate 32 is disposed at a circumferential portion of the air conduit 10 while being spaced from the guide surface 30 by a predetermined distance. The guide plate 32 may have a circular cross-section and is provided at a side portion of the air conduit 10 for expansion of the tube 12 to be induced in a predetermined direction or directions. That is, expansion along length direction of the air conduit 10 of the tube 12 is limited by the guide surface 30 and the guide plate 32 so that the tube 12 expands to circumferential or substantially circumferential directions of the air conduit 10 (FIG. 3). In a modified embodiment, the guide plate may have other cross-section, such as oval, rectangular, and the like. The guide plate 32 and the air conduit 10 can be made of the same material or different materials. The guide plate 32 and the air conduit 10 can be formed separately or integrally.

Suitably, a shock absorbing plate 34 can be disposed beneath or below the guide plate 32 for absorbing impact according to expansion of the tube 12. The shock absorbing plate 34 may have a circular cross-section. The shape and size of the shock absorbing plate 34 can be designed to be the same as or different from those of the guide plate 32.

The clamp device may further include a cover 36 for wrapping the guide surface 30. The cover 36 is disposed to an outside of the guide surface 30. The cover 36 is fixed closely to the guide surface 30 by various fixing means, e.g., a bolt 38. The cover 36 can absorb impact to the guide surface 30 and fix the tube 12.

Figure 4:
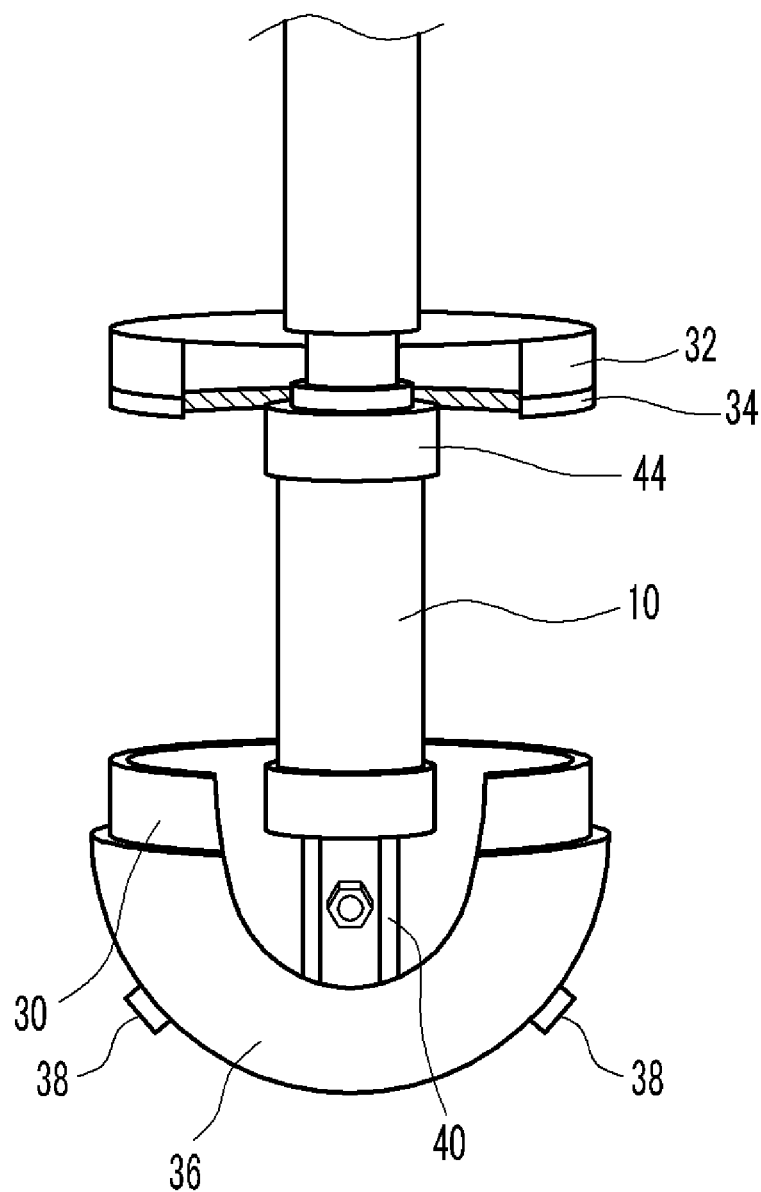
FIG. 4 and FIG. 5 are partial perspective views of a clamp device according to an exemplary embodiment of the present invention.

FIG. 4 and FIG. 5 are partial perspective views of a clamp device according to an exemplary embodiment of the present invention.

At least one absorber 40 may be vertically or substantially vertically disposed between the guide surface 30 and an end of the air conduit 10 such that the absorber 40 connects the guide surface 30 and the end of the air conduit 10. Although the drawings show that two absorbers 40 are disposed between the air conduit 10 and the guide surface 30, the number of the absorber 40 can vary. As described above, the guide surface 30 is disposed spaced from the end of the air conduit 10 so that the air can be ejected therefrom. The absorber 40 can be formed by a general absorber using, e.g., air or hydraulic pressure that can absorb impact due to fast inflowing air.

Suitably, at least one guide protrusion 42 may be provided at or near the inner center of the guide surface 30. As shown in FIG. 5, for example, a conical protrusion is provided at the inner center of the guide surface 30. The air ejected from the end of the air conduit 10 is guided to the tube 12 via the inside of the guide surface 30 by the guide protrusion 42. The shape and number of the protrusion can vary depending on design requirement and/or choice.

For the tube 12 to be expanded to clamp a panel, the tube 12 is made of a material with elasticity.

The tube 12 is configured to be in communication with the air conduit 10. For instance, as shown in FIG. 2, an end of the tube 12 may be air-tight connected to the air conduit 10 by a locking unit 44. The other end of the tube 12 is extended toward the guide surface 30 and fixed between the guide surface 30 and the cover 36. For example, the other end of the tube 12 may be inserted therebetween and fixed by the bolt 38 such that it is air-tightened.

Although not shown in the drawings, a sealer and/or a supplemental cover can be applied to a connecting portion(s) of the tube 12, the air conduit 10 and the guide surface 30 for sealing and/or preventing damage.

Figure 6:
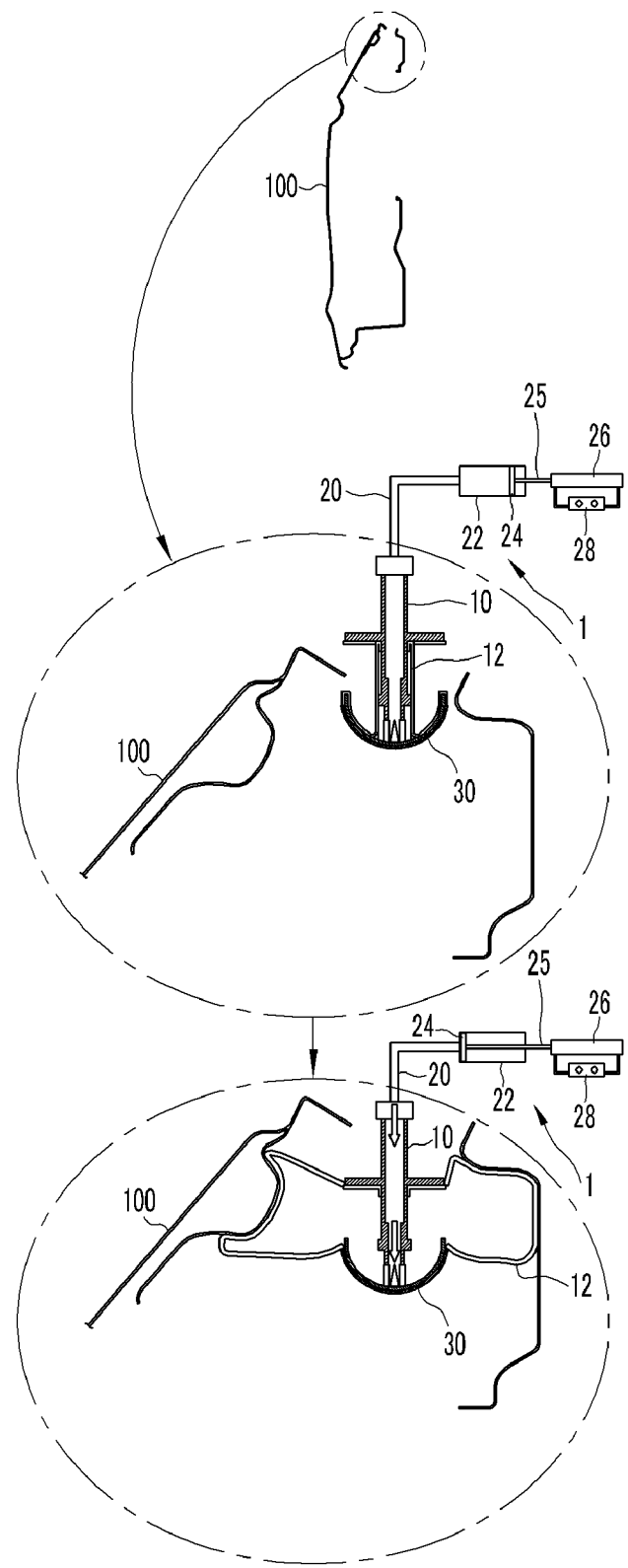
FIG. 6 is a cross-sectional view showing the operation of a clamp device according to an exemplary embodiment of the present invention.

Hereinafter, the operation of the clamp device 1 is described with reference to FIG. 6 shows a process of clamping a door panel 100.

The clamp device 1 is inserted into the door panel 100 through between an inner panel and an outer panel thereof. Before and during the insertion, the tube 12 of the clamp device 1 is in constricted state. After the insertion, the solenoid valve 28 is operated and the driving cylinder 26 is extended. When the driving cylinder 26 is extended, the piston 24 connected to the piston rod 25 is moved in the cylinder housing 22 and the air inside the cylinder housing 22 is exhausted.

As shown in FIG. 3, the air exhausted from the cylinder housing 22 flows to the air conduit 10 via the air hose 20. The air in the air conduit 10 is ejected through the end of the air conduit 10. The ejected air is guided along the interior surface of the guide surface 30 by the guide protrusion 42 and expands the tube 12. The tube 12 expands to circumferential or substantially circumferential directions of the air conduit 10 between the guide plate 32 and the guide surface 30.

In some cases, the tube 12 may be rapidly expanded so as to impact the guide plate 32. The shock absorbing plate 34 can absorb the impact.

Due to the expansion, the tube 12 can closely come into contact with some or all of the inner surface of the door panel 100 regardless of what shape the panel 100 has.

After the door panel 100 is transferred to a desired place, the clamp device 10 releases the door panel 100 by constricting operation. More particularly, when the driving cylinder 26 is constricted, the piston 24 returns to the original position and negative pressure is generated in the cylinder housing 22. Thus, the air in the tube 12 returns to the cylinder housing 22 via the air conduit 10 and the air hose 20 and the tube 12 is constricted.

For convenience in explanation and accurate definition in the appended claims, the terms "front", "rear", "inside" and "inner" are used to describe features of the exemplary embodiments with reference to the positions of such features as displayed in the figures. The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A clamp device comprising:
    an air conduit;
    an air supplying unit that is communicated with the air conduit for selectively supplying air thereto; and
    a tube that is communication with the air conduit and is expandable in a circumferential direction,
    wherein the air supplying unit comprises:
    an air hose connected with an end of the air conduit;
    a cylinder housing connected to the air hose;
    a piston disposed within the cylinder housing; and
    a driving unit for reciprocating the piston so that some or all of air inside the cylinder housing can be exhausted, and
    further comprising a guide surface which is provided below the other end of the air conduit and has a curved interior surface,
    wherein the tube is airtight connected to the air conduit and the guide surface.

2. The clamp device of claim 1, further comprising a guide plate which is provided on the outer circumference of the air conduit at a position spaced from the guide surface by a predetermined distance such that expansion of the tube can be made in a predetermined direction or directions.

3. The clamp device of claim 2, further comprising a shock absorbing plate which is disposed beneath or below the guide plate for absorbing an impact applied by expansion of the tube.

4. The clamp device of claim 2, further comprising an absorber which is disposed vertically or substantially vertically between the guide surface and the other end of the air conduit.

5. The clamp device of claim 2, further comprising a guide protrusion which is disposed at or near the inner center of the guide surface for guiding air along the interior surface of the guide surface.

6. The clamp device of claim 2, further comprising a cover wrapping the guide surface.

7. A clamp device comprising:
    an air conduit;
    an air supplying unit that is communicated with the air conduit for selectively supplying air thereto; and
    a tube that is communication with the air conduit and is expandable in a circumferential direction, and
    further comprising a guide surface which is provided below the other end of the air conduit and has a curved interior surface, wherein the tube is airtight connected to the air conduit and the guide surface.

8. The clamp device of claim 7, further comprising a guide plate which is provided on the outer circumference of the air conduit at a position spaced from the guide surface by a predetermined distance such that expansion of the tube can be made in a predetermined direction or directions.

9. The clamp device of claim 8, further comprising a shock absorbing plate which is disposed beneath or below the guide plate for absorbing an impact applied by expansion of the tube.

10. The clamp device of claim 8, further comprising an absorber which is disposed vertically or substantially vertically between the guide surface and the other end of the air conduit.

11. The clamp device of claim 8, further comprising a guide protrusion which is disposed at or near the inner center of the guide surface for guiding air along the interior surface of the guide surface.

12. The clamp device of claim 8, further comprising a cover wrapping the guide surface.

\* \* \* \* \*